(12) United States Patent
Shiokawa et al.

(10) Patent No.: US 7,658,543 B2
(45) Date of Patent: Feb. 9, 2010

(54) PACKAGING MATERIAL AND PACKAGING BAG

(75) Inventors: Shunichi Shiokawa, Tokyo (JP); Shingo Masai, Hiroshima (JP)

(73) Assignees: Toppan Printing Co., Ltd., Tokyo (JP); Aohata Corporation, Hiroshima (JP)

( * ) Notice: Subject to any disclaimer, the term of this patent is extended or adjusted under 35 U.S.C. 154(b) by 912 days.

(21) Appl. No.: 10/511,313

(22) PCT Filed: Mar. 25, 2003

(86) PCT No.: PCT/JP03/03646

§ 371 (c)(1),
(2), (4) Date: Apr. 19, 2005

(87) PCT Pub. No.: WO03/086895

PCT Pub. Date: Oct. 23, 2003

(65) Prior Publication Data

US 2005/0227028 A1    Oct. 13, 2005

(30) Foreign Application Priority Data

Apr. 17, 2002    (JP) .............................. 2002-115022

(51) Int. Cl.
*B65D 30/10* (2006.01)
(52) U.S. Cl. ...................... 383/107; 383/109; 383/121
(58) Field of Classification Search ................ 383/109, 383/108, 105, 113, 5, 107; 116/202; 73/52
See application file for complete search history.

(56) References Cited

U.S. PATENT DOCUMENTS

| 4,147,291 | A | * | 4/1979 | Akao et al. ................. 383/113 |
| 4,452,846 | A | * | 6/1984 | Akao .......................... 428/220 |
| 4,848,931 | A | * | 7/1989 | Kamada et al. ............. 383/104 |
| 5,095,204 | A | * | 3/1992 | Novini ................... 250/223 B |
| 5,095,210 | A | * | 3/1992 | Wheatley et al. ....... 250/339.05 |
| 5,260,766 | A | * | 11/1993 | Armitage ................. 356/237.1 |
| 5,319,475 | A | * | 6/1994 | Kay et al. ...................... 359/2 |
| 5,488,480 | A | * | 1/1996 | Saindon et al. ............. 356/429 |
| 6,025,919 | A | * | 2/2000 | Hidalgo et al. ............. 356/432 |
| 6,049,379 | A | * | 4/2000 | Lucas ....................... 356/240.1 |
| 6,060,137 | A | * | 5/2000 | Akao ......................... 428/35.2 |

(Continued)

FOREIGN PATENT DOCUMENTS

EP    1138476 A1 *  4/2001

(Continued)

OTHER PUBLICATIONS

PCT International Preliminary Examination Report, Mar. 23, 2004.*
English translation of JPO 409314719-A.*

*Primary Examiner*—Nathan J Newhouse
*Assistant Examiner*—Devin Salmon

(57) ABSTRACT

A packaging bag (1) where the heat sealing parts of packaging materials (2, 3) having a printed light shielding layer (14) in the layer structure are overlapped and heat sealed, and a sealing state confirming part (8) having a light transmittance higher than that of the other sealing side is provided across one sealing side (11) out of both sealing sides facing each other when the heat sealing parts are overlapped. Visual confirmation of incomplete heat sealing part can thereby be facilitated.

11 Claims, 5 Drawing Sheets

U.S. PATENT DOCUMENTS

| | | | |
|---|---|---|---|
| 6,268,029 B1 * | 7/2001 | Akao | 428/35.2 |
| 6,543,208 B1 * | 4/2003 | Kobayashi et al. | 53/452 |
| 6,592,975 B1 * | 7/2003 | Ueyama et al. | 428/212 |
| 2006/0048486 A1 * | 3/2006 | Laing et al. | 53/469 |

FOREIGN PATENT DOCUMENTS

| | | | |
|---|---|---|---|
| JP | 48-9908 | | 3/1973 |
| JP | 61-33956 | * | 2/1986 |
| JP | 61-83559 | | 6/1986 |
| JP | 409314719 A | * | 5/1996 |
| JP | 10-305513 | | 11/1998 |
| JP | 2000-7047 | | 1/2000 |

* cited by examiner

PACKAGING MATERIAL AND PACKAGING BAG

TECHNICAL FIELD

The present invention relates to a packaging material in order to obtain a packaging bag which seals contents closely by heat seal and relates to the packaging bag made from the packaging material.

BACKGROUND ART

In recent years, a marketing product using a packaging bag such as retort pouch and the like which can keep foods as contents, is required to avoid alterations of food tastes and of qualities during a period from producing the marketing product until eating by customers. Therefore, a packaging material having a layer structure laminated by an aluminum foil or aluminum vapor deposition layer so as to be the internal side of a bag against a base material film provided with back printing, is used for such packaging bag and the packaging bag is devised to obtain a light shielding provided by giving said aluminum foil or aluminum vapor deposition layer in the layer structure.

Also, since retort foods and the like provided by the above mentioned packaging bag are widely and commonly distributed and consumed, the packaging bag made by the above mentioned packaging material may come into circumstances to be disposed as wastes, and in case of a thermal disposal of the packaging bag, the fact that metal portion in the packaging material remains as residues in an incinerator, is acknowledged as a problem.

From this point of view, in order to retain a light shielding property without a use of metal such as aluminum, a light shielding layer made by way of printing is applied to form in the layer structure of the packaging material. And since a coloring is not suitable for the marketing product when a black color ink having high light shielding property is used in case of forming said light shielding layer by printing, selecting a color having the light shielding function as said shielding layer and simultaneously being suitable color for food containers, has been tried.

Meanwhile, as the above mentioned packaging bag such as retort pouch is in the form that the packaging materials are laid on each other so that facing peripheral edge parts are heat sealed, the packaging bag before packing contents is in the form having an open state fill opening at one side with facing non-sealed position which is intended for heat seal. And the packaging bag having the open end at one side as the fill opening is set to the filling machine to fill contents from said fill opening, and subsequently, after heat seal the fill opening, as described above, the peripheral position is heat sealed so that a form of the market product having seal contents closely is obtained.

Also, while filling, since splashes and the like of contents are adhered on facing surfaces of position intended for heat seal of the fill opening and since heat seal may possibly be done with keeping the state, after the heat seal is done at the fill opening, to the position which was formerly the fill opening, the existence of defective seal and the like if the bitten seal which caught foreign matters or the insufficient seal occurs, is inspected visually as holding the heat sealed fill opening up against light and the like.

However, for the packaging bag applying the packaging material comprising aluminum foil in the layer structure, since the packaging material itself has extremely high light shielding property, an interface state between seal sides which were formerly the fill opening position, can not be so as to be seen by holding up to light and a detection of the defective seal such as the bitten seal or the insufficient seal is difficult and also, the detection of the defective seal is difficult as well for even packaging bag which was applied the packaging material having the light shielding layer by printing as described above.

DISCLOSURE OF INVENTION

The subject of the present invention is to provide that a defective seal at heat seal position of a fill opening for contents and of folded parts of gusset bags and of pillow bags is made easy for the visual recognition while retaining light shielding property to contents in preparation for a light shielding layer in packaging material by printing and the purpose is to perform the seal inspection to the heat seal positions appropriately.

The present invention is provided under considerations of the above mentioned object and relates to solve the above mentioned subject by proposing where a packaging material comprising a light shielding layer which is formed by printing in a layer structure and positions intended for heat seal to be laid on and heat sealed with each other in making a packaging bag wherein one of the positions for heat seal to be laid on and heat sealed each other is provided with a seal state confirming part and a light transmittance of said heat seal confirming part is higher than a light transmittance of the other intended position for heat seal.

In the above mentioned packaging material of the present invention, the difference between the light transmittance of the seal state confirming part and the light transmittance of the other intended position for heat seal is preferable to be 15 points and above. Also, the above mentioned seal state confirming part is preferable to be in the area where a blank pattern of the light shielding layer printed by a light shielding ink is located in the above mentioned light shielding layer.

And in the above mentioned packaging material, an odor ingredients barrier layer provided at the side to be internal from said light shielding layer in the bag when the bag is made, can be made as the layer structure. Also, in the layer structure, the packaging material can have the impact resistive layer which absorbs the impact.

And further, another feature of the present invention relates to solve the above mentioned subject by proposing the packaging bag wherein seal sides that are position intended for heat seal of the packaging material comprising a light shielding layer formed by printing in the layer structure are laid on each other to heat seal and as for seal sides that are laminated at least in one of the seal sides of the intended position for heat seal, the seal state confirming part is provided over the one of seal sides, and the light transmittance of the heat seal confirming part is higher than the light transmittance of the other seal side.

In the packaging bag of the present invention, a difference between the light transmittance of the seal state confirming part and the light transmittance of the other seal side is preferable to be 15 points and above. Also, the above mentioned seal state confirming part is preferable to be in the area where the blank pattern of the light shielding layer printed by a light shielding ink is located in the above mentioned light shielding layer.

Moreover, in the packaging bag of the present invention, the odor ingredients barrier layer can be formed at the side to be internal from said light shielding layer in the layer structure of the bag. Also, the layer structure is possible to have the impact resistive layer which absorbs impact.

According to the present invention, since the seal state confirming part is provided at the intended position for heat seal in one side of the packaging materials when the bag is made, the existence of defective seal by bitten seal or insufficient seal at the seal positions of the fill opening or the folded parts of the packaging bag having the seal state confirming part can be confirmed firmly and easily so that the closely-sealed guarantee can be performed. Also the existence of the defective seal can be treated and evaluated optically. Moreover, by providing the odor ingredients barrier layer, the odor ingredients from printing ink used for the light shielding layer can be prevented firmly to influence to contents, so that the packaging materials provide excellent effect of serviceability.

BEST MODE FOR CARRYING OUT THE INVENTION

Figure 1:
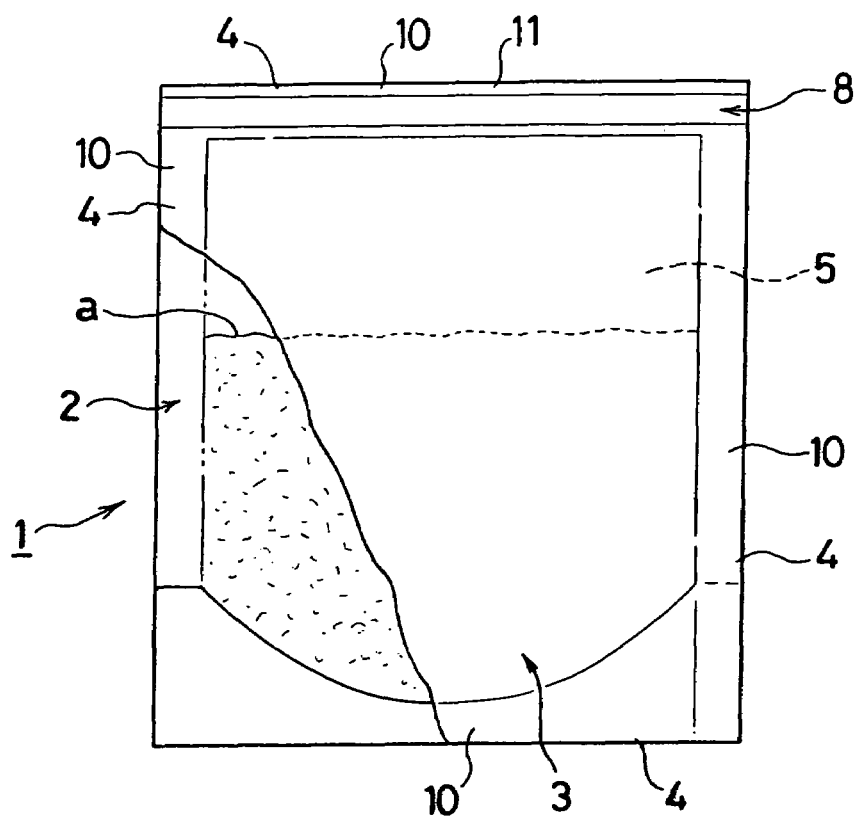
FIG. 1 illustrates a seal state confirming part side in an example of packaging bag according to the present invention.

With reference to the drawings, the preferred embodiments will be explained in detail as follows.

In the drawings, a reference numeral 1 shows a packaging bag where the packaging bag 1 is made to a standing pouch type market product embodiment where a filling space 5, which is formed between packaging materials 2, 3 and which is filled with contents a such as foods, is closely sealed by heat seal at four edge sides 4 facing each other with two pieces of packaging materials 2, 3 having light shielding property to be laid on each other.

Figure 2:
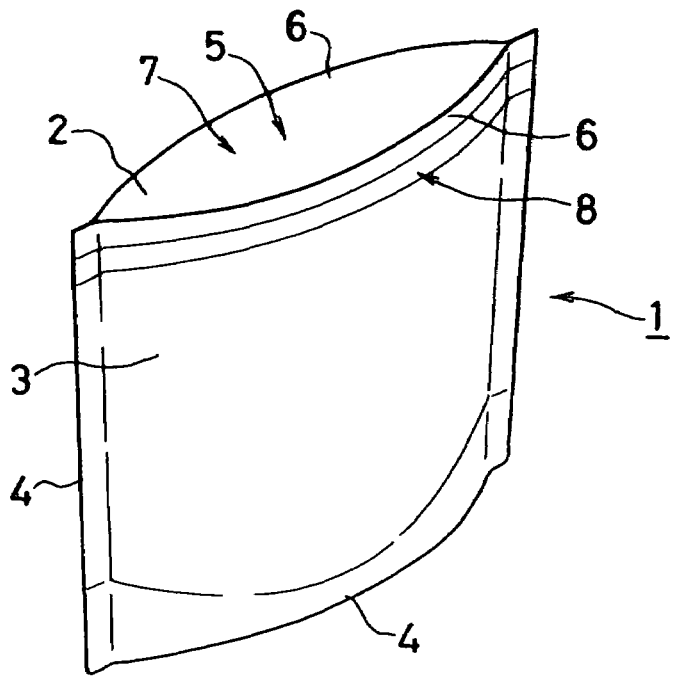
FIG. 2 illustrates a form having an opened fill opening in an example of a packaging bag.

In the embodiment of the packaging bag 1 before filling contents, as shown in FIG. 2, previously edge sides 4 of two side positions and bottom position are heat sealed, and intended positions for heat seal 6 in the respective upper positions of packaging materials 2, 3 are made to a bag in the state having opposing opened fill opening 7 so that a filling nozzle and the like of the filling machine is inserted to the filling space 5 through the fill opening 7, and after contents are filled, the above mentioned intended positions for heat seal 6 are heat sealed and the fill opening 7 is closed.

As for two pieces of the packaging materials 2,3 comprising the above mentioned packaging bag 1, the packaging material 2 which results in the front face of the packaging bag 1 (product front) is made to constitute of a layer having light shielding property in a whole area as will be described later.

On the other hand, in the back face of the packaging material 3 in the packaging bag 1, a seal state confirming part 8 in intended positions for heat seal 6 is prepared, and the positions other than a seal state confirming part 8 have a layer structure with a light shielding property which is in the same way as the packaging material 2.

The above mentioned seal state confirming part 8 is constituted that a non light shielding area 9, where a light shielding printing layer which will be described later is not provided, is located in the layer structure of the packaging material 3, and the light shielding property is made low and the light transmittance is raised compared with other positions of the seal state confirming part 8 in the packaging materials 2, 3. And, since the fill opening 7 is closed by heat seal at the intended positions for heat seal 6 which are laid on each other, in heat seal position 10 at the upper side of the packaging bag which is heat sealed at the fill opening as in FIG. 3, the seal state confirming part 8 located in the seal side 11, on the one side, corresponds to the other seal side 12 so that the interfacial state of the heat seal position 10 can be confirmed through the seal state confirming part 8 as will be described later.

Figure 3:
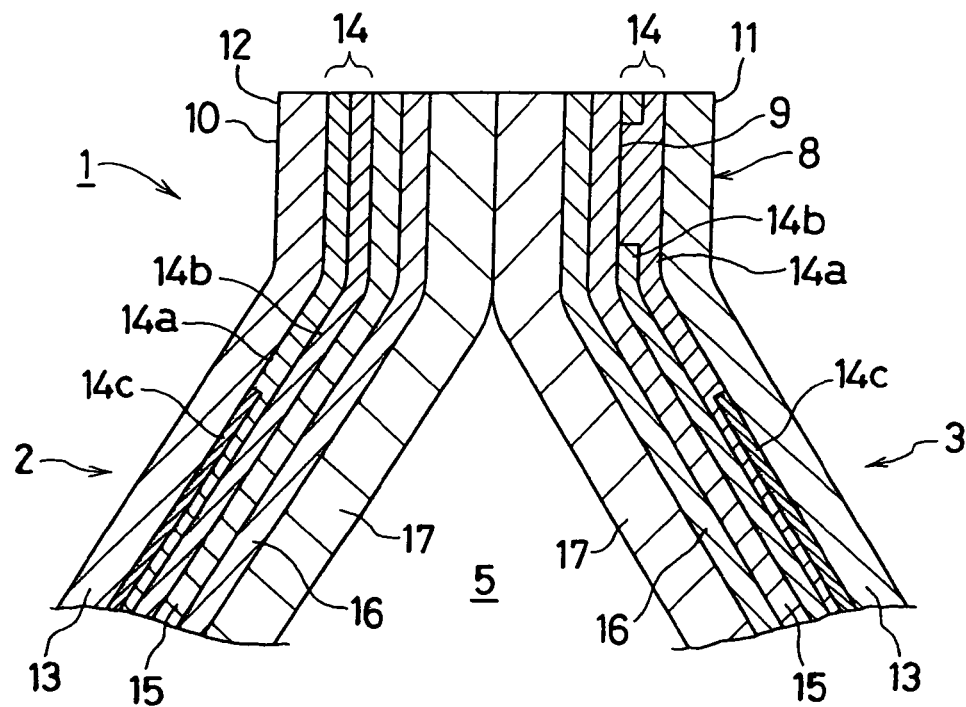
FIG. 3 illustrates a cross section of a heat seal position in the upper part in an example of a packaging bag.

In the packaging materials 2, 3 to obtain the above mentioned packaging bag 1, the layer structures other than the above mentioned seal state confirming part 8 in the respective packaging materials, are constituted, from the external side of the bag when the bag is made, as a base material film 13, a light shielding layer 14, a barrier layer 15, an intermediate base material layer 16, and a sealant layer 17, as shown in FIG. 3. For example, the base material film 13 is prepared by polyethylene terephthalate film (thickness 12 μm), and the barrier layer 15 is prepared by a transparent film (thickness 12 μm) which is provided gas barrier property by vapor deposition of silicate oxide or aluminum oxide on polyethylene terephthalate film (mono- or bi-axially oriented film). Also the intermediate base material layer 16 is prepared by nylon resin layer (15 μm thickness) and the sealant layer 17 is prepared by a non-oriented polypropylene film (thickness 60 μm).

Accordingly, in the packaging materials 2, 3, since the barrier layer 15 is arranged in the layer structure, the packaging materials 2,3 are made to have a gas barrier property (oxygen permeation prevention, moisture resistance). As the above mentioned barrier layer 15 can be prepared from, besides the above mentioned structures, the transparent film having the gas barrier property that is provided by mono- or bi-axially oriented thermoplastic resin film such as polypropylene or nylon with vapor deposition of inorganic materials such as silicone dioxide or aluminum oxide. And, as gas barrier film of the barrier layer 15 other than the above mentioned, films having barrier property such as EVOH (saponified ethylene-vinyl acetate copolymer) film, PVDC (polyvinylidene chloride resin) or barrier coat film provided by coating layer having barrier property can be used.

Moreover, in the packaging materials 2,3, even other positions of the above mentioned seal state confirming part 8, since the light shielding layer including light shielding printed layer, which will be described later, by a chromic color ink (light shielding ink) having the light shielding property is provided in the layer structure, the packaging bag 1 prevents from alterations of qualities to contents a in the filling space 5 by an incident light, and equally as the above mentioned light shielding printed layer, a chronic color which harmonizes to the contents is selected, so that a warm feeling is provided, not only the contents to the sight when the bag is opened, but also additionally hue as a whole packaging bag so as to retain merchantability as the food packaging bag.

The above mentioned light shielding layer 14 in the layer structures of the above mentioned packaging materials 2,3 is made by printing to the following every layer, where from the above mentioned base material film 13 side, white color printed layer 14a which is printed by white color ink with solid printing and the above mentioned light shielding printed layer 14b which is made from solid printing by the use of light shielding ink constituting from chronic color (for example sepia color) which is selected from color having light shielding, are laid on each other. Here, as the light shielding layer 14, a pattern printed layer 14c which decorates the packaging bag 1 to the side of the base material film layer 13 is constituted to be laminated.

And in the packaging material 3 which is in the back face of the packaging bag 1, the seal state confirming part 8 located at the seal side 11 is made where the light shielding layer 14b in the above mentioned light shielding layer 14 is not provided on the position of the above mentioned non-light shielding area 9, and to be more precise, during the production of the packaging material 3, when the solid printing is performed by the above mentioned light shielding ink, a blank pattern with narrow strip in order to obtain the non-light shielding area 9 is printed. Accordingly, the seal state confirming part 8 is made less light shielding property compared with a whole packaging material 3 so that an area as having the light transmittance is formed. Naturally even if comparing with the packaging material 2, the area is made of the part that the light shielding property is low and the light transmittance is raised.

Figure 4:
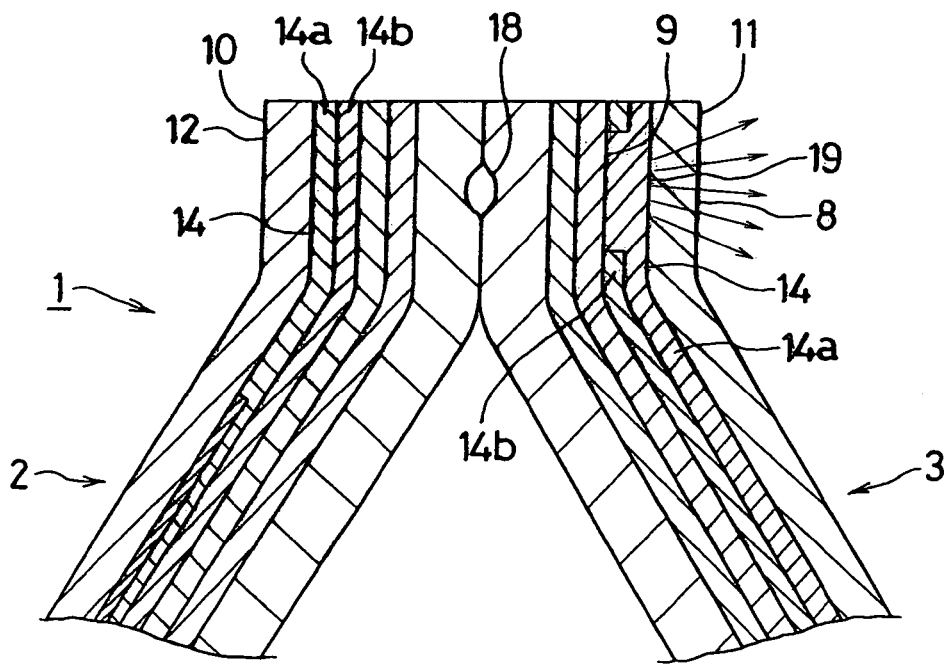
FIG. 4 illustrates reflection diffusion at a seal state confirming part in an example of a packaging bag.

Providing as mentioned above, at the closed fill opening 7 of the packaging bag 1, since the seal state confirming part 8 is located only at the seal side 11, as shown in FIG. 4, the bitten seal state or the insufficient state can be visually recognized by the following function when the defective seal 18 occurs.

To begin with, in case that the heat seal position 10 of which the fill opening was formed, is observed from the packaging material 3 side of the back face, in the non light shielding area 9 of the seal side 11 on the one side, since the above mentioned light shielding printed layer 14 b does not exist, white color density at the seal state confirming part 8 is in the deep state even slightly compared with the other positions, but the comparison with the other positions of heat seal shows less conspicuous, therefore, the packaging bag still retains an external appearance.

And, as shown in FIG. 4, when there is a bitten seal at the above mentioned heat seal position 10, the white color density becomes deep by the white color reflection diffusion generated from a position 19 of the white color printed layer 14a corresponding to the defective seal position 18, so that the bitten seal state can be confirmed visually so as to differ extremely compared with the white color density of a whole seal state confirming part 8.

Figure 5:
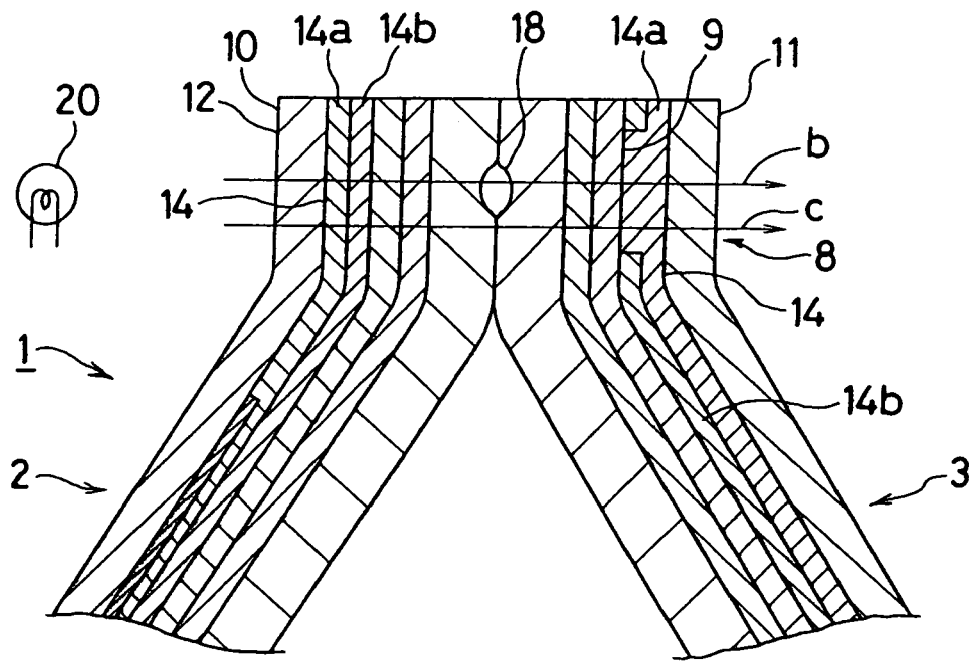
FIG. 5 illustrates absorption permeation at a seal state confirming part in an example of a packaging bag.

Then, as shown in FIG. 5, a light source 20 is provided to the packaging material 2 side of the front face so as to observe the light which is transmitted through the seal sides 12, 11 from the packaging material 3 side of the back face. At this time, by observing the light b which is also absorbed and transmitted additionally through the defective seal position 18 and the light c which is absorbed and transmitted through the seal state confirming part 8 around the defective seal position 18, the color difference can be so as to confirm.

For example, if there is the bitten defective seal position 18 of a solid material such as meat, a shadow is in appearing state at the place of the defective seal position 18 observing through the packaging material 3 side of the back face, and the color difference of the white color density generated by the difference of the light transmittance so that it is recognized visually as the bitten seal state. Also, in case that an insufficient seal occurs at the heat seal position 10, same as the case of the recognition of reflection diffusion of the bitten seal state, as shown in FIG. 4, by white color reflection diffusion generated at the position 19 of the white color printed layer 14a which corresponds to the insufficient seal of the defective seal position 18, the white color density becomes deep so as to differ extremely compared with the white color density of a whole seal state confirming part 8 so that the insufficient seal state can be recognized visually.

Accordingly, since, in case that the defective seal position 18 is directly observed in the seal state confirming part 8, the white color density at the defective seal position 18 becomes deep compared with the other position of seal state confirming part, and since, in case that the defective seal position 18 is observed at the seal state confirming part 8 in the state through light from the light source, the color difference of the white color density occurring at the bitten seal or insufficient seal can be easily found out.

Figure 6:
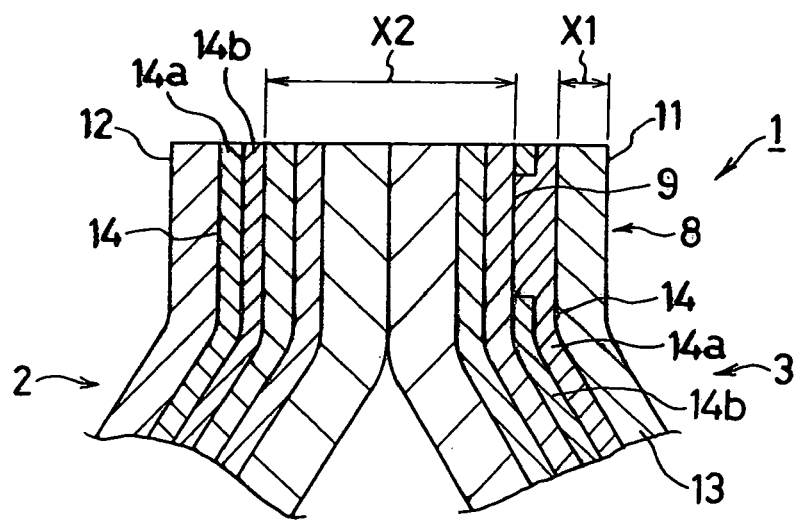
FIG. 6 illustrates a distance of a seal state confirming part from a surface layer and a distance of a background light shielding layer.

The recognition when the seal state confirming part 8 is observed from the packaging material 3 side of the back face, is influenced by the distance between the position of the white color printed layer 14a which is solid printed white color ink having the reflection and diffusion, and the position of the light shielding layer 14 of the packaging material 2 of the front face side which is the background. Also, as shown in FIG. 6, the location of the white color printed layer 14a gives good result when the distance from the outermost layer, X1, is made as short as possible (The light reflects at the position corresponding to the defective seal position 18 and easily diffuses.).

For example, in case that for the above mentioned seal state confirming part 8 at the seal side 11, the light shielding printed layer 14b is not provided while only the white color printed layer 14a of the light shielding layer 14 is formed, as the above mentioned base material film 13, 12 µm thick polyethylene terephthalate film, 15 µm, 25 µm thick oriented nylon film, or 20 µm thick oriented polypropylene film are selected and the above mentioned distance X 1 is preferable as in the range between from 12 to 25 µm. Also, the distance X 2 between the light shielding layers 14 of the seal sides 11,12 is preferable to be in the range of from 100 to 300 µm.

In the above mentioned preferred embodiment, the seal state confirming part 8 is formed that the non light shielding area 9 by the blank pattern of the light shielding printed layer 14b in the packaging material 3 is located, and the light shielding property is made low compared with the other positions of the seal state confirming part 8 and the light transmittance is raised, and to be more precise, the light transmittance of wavelength from 300 to 800 nm (visible light) at the seal state confirming part 8 is preferable to be 25% and above, and the light transmittance of from 300 to 800 nm (visible light) at the other positions is preferable to be 10% or less. Specifically, the difference of the light transmittance between the seal state confirming part 8 and other positions is preferable to be 15 points and above.

Then, from the packaging materials having layer structures shown below, the plural pieces of packaging bags are made for Example 1, Comparative Example 1, Comparative Example 2, Comparative Example 3, Comparative Example 4, and Comparative Example 5, and in the packaging materials of Example 1 and from Comparative Example 1 to Comparative Example 5, the light transmittances of the seal state confirming parts at one of the seal sides and at the other seal sides which form the heat seal, are measured at wavelength from 300 to 800 nm, and equally the bitten seal at the seal positions by visual recognition and the recognition of defectiveness to the defective seal are made to comparative study. The results are shown in Table 1.

Figure 7:
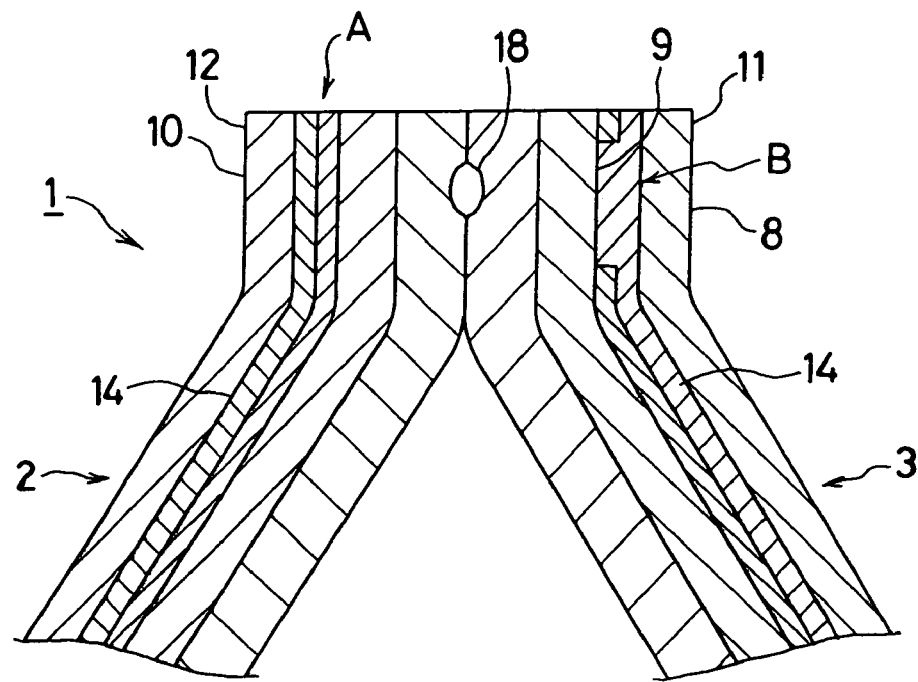
FIG. 7 illustrates a structure of the upper part of a packaging bag used for a study of recognition.

The layer structures of the packaging materials for Example 1, Comparative Example 1, Comparative Example 2, Comparative Example 3 are set as polyethylene terephthalate film of which the gas barrier property is provided by aluminum oxide vapor deposition (base material film 12 μm)/printing (light shielding layer)/oriented nylon film (intermediate base material film 15 μm)/non-oriented polypropylene film (sealant layer 70 μm)(see FIG. 7).

In the packaging material applied in Comparative Example 4, the layer structure of the packaging material at the front face side of the packaging bag is set as polyethylene terephthalate film (base material film 12 μm)/aluminum foil (light shielding layer 7 μm)/non-oriented polypropylene film (sealant layer 70 μm).

Also, the layer structure of packaging material at the back face side of the packaging bag is set as polyethylene terephthalate film of which gas barrier property is provided by aluminum oxide vapor deposition (base material film 12 μm)/printing (light shielding layer/oriented nylon film (intermediate base material layer 15 μm)/non-oriented polypropylene film (sealant layer 70 μm).

In the packaging material used for Comparative Example 5, the layer structure of the packaging material at the front face side of the packaging bag is set as polyethylene terephthalate film of which gas barrier property is provided by aluminum oxide vapor deposition (base material film 12 μm)/printing (light shielding functional part)/non-oriented nylon film (intermediate base material layer 15 μm)/translucent white non-oriented polypropylene film (opacifying functional part, sealant layer 70 μm).

Also, the layer structure of the packaging material at the back face side of the packaging bag is set as polyethylene terephthalate film of which gas barrier property is provided by aluminum oxide vapor deposition (base material film 12 μm)/non-oriented nylon film (intermediate base material layer 15 μm)/translucent white non-oriented polypropylene film (opacifying functional part, sealant layer 70 μm).

As detail examples for bitten seals to examine the recognition at the seal state confirming part, a carbon is used for black color, various types of meat for brown color, and meat sauce for red color. And detail examples of white color and insufficient seal are made so as to form insufficient seal states.

As shown in Table 1, the packaging bag in Example 1 is made clear that the recognition of defectiveness by reflection diffusion shows good results and equally the recognition of defectiveness, also, by the absorption transmission shows good results.

Figure 8:
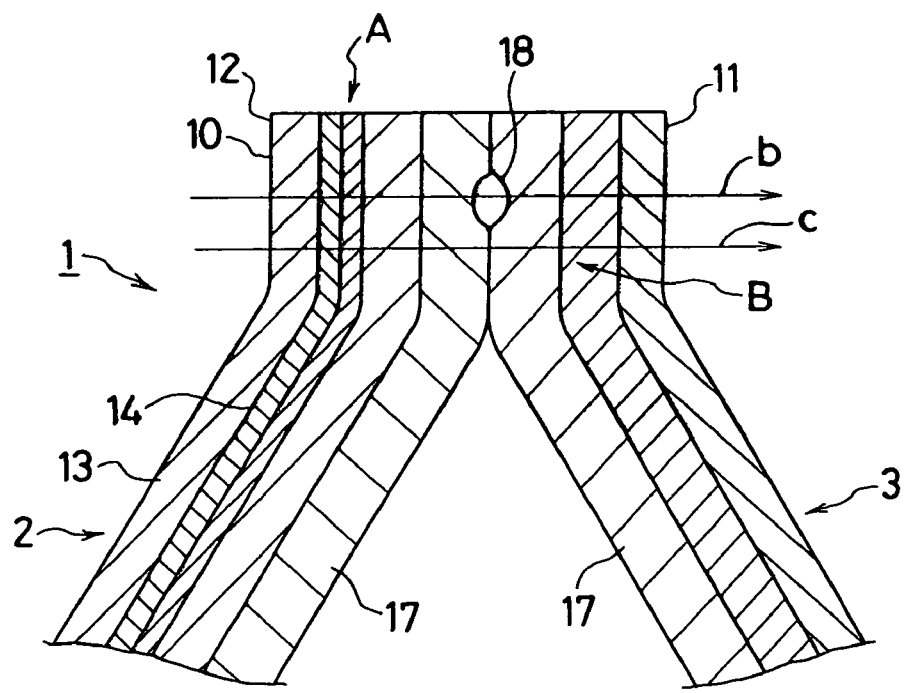
FIG. 8 illustrates a structure of the upper part of a packaging bag having a translucent white sealant layer.

Meanwhile, in Comparative Example 5, in either case of the front face of the packaging material and of the back face of the packaging material of the packaging bag, the films incorporated by titanium white into polypropylene resin are used for sealant layers and the sealant layers are formed as opacifying layer having opacifying function, where, as shown in FIG. 8, since the sealant layer (translucent white non-oriented polypropylene film) 17 at the seal side 11 provides low level of reflection diffusion at the defective seal part 18, and also since the sealant layer 17 is located to the opposite side, the transmission property of the light b which passes through the defective seal part 18 or the light c which passes other than the defective seal position 18 does not get to such a level that can retain the recognition of defectiveness.

Then, in the packaging materials of the packaging bag in the above mentioned Example 1, the recognition of defectiveness is studied on every example (achromatic color or chromatic color from 1 to 6) where the light shielding layer 14 of the seal state confirming part 8 is not limited to the white color printed layer 14a only, but is applied by printing with achromatic color or chromatic color from 1 to 6 to the internal side of the packaging bag of the white color printed layer 14a. The results are shown in Table 2. Here, the light transmittances are the figures which are measured at the wavelength of from 300 to 800 nm light (visible light).

As shown in Table 2, in the printing applied to the white color printed layer 14a of the seal state confirming part 8, usable hues are made known to be red, orange, yellow, and green. In case of indigo and purple, since the light transmittance from the light shielding layer of the packaging material 2 of the front face side is hindered by the light shielding layer (indigo/white or purple/white applied printing) of the seal state confirming part 8, the confirmation of the insufficient seal part by reflection diffusion is found to be difficult.

For printing inks applied to the white printed layer 14a, gray, red, orange, yellow, green, indigo, and purple color inks of LP Super manufactured by TOYO INK MFG Co., Ltd., are used.

In the above mentioned Example, for the seal sides 11, 12 which form the upper part of the heat seal position 10 in the packaging bag 1 which is heat sealed at the fill opening, the present invention is not limited to the seal state confirming part 8 provided at the seal side 11, on the one side, but in a whole periphery heat seal position of the packaging bag 1, the above mentioned seal state confirming part may be so as to form at one of the seal sides.

Also, the above mentioned packaging bag is not limited to the form of standing pouch, but the present invention can be implemented to the packaging bags of the gusset packaging type, the packaging bag of pillow packaging type, and three-way pouch packaging type.

Moreover, the following structure can be implemented in case of the following conditions. For example, in said Example of the present invention, the packaging materials 2, 3 are provided gas barrier property by the above mentioned barrier layer while the base material film 13 as having gas barrier property is used and in such a case, the barrier layer 15 can be made so as not to be provided.

Also, according to said Example of the present invention, the nylon resin layer is shown as the intermediate base material layer 16, where the material itself which forms the intermediate base material layer in the packaging materials 2, 3, is preferable to be transparent resin, and the nylon resin layer (oriented nylon resin) is one example. And besides the oriented nylon resin, when the intermediate base material layer 16 is made as impact absorption layer by using oriented nylon film which has excellent impact resistance by absorbing impact, impact resistance and pinhole resistance and the like improve. But the intermediate base material layer 16 itself is not required essentially.

Moreover, when the oriented nylon film is used as the base material film or barrier layer, the layer becomes to provide an additional role as the impact absorption layer, so that the layer contributes to the improvement of the impact resistance and pinhole resistance of the packaging material. Also, the impact absorption layer by the oriented nylon film is possible so as to provide between the sealant layer 17 and the intermediate base layer 16.

Also, non-oriented polypropylene film as the sealant layer is given as Example, and it is one of the suitable examples in case of obtaining the packaging bag required heat resistance, and other thermoplastic resin films that fit to the condition can be applied where polyolefin resins such as polyethylene, polypropylene, ethylene-vinyl acetate copolymer, or ethylene-propylene block copolymer can be used.

The lamination of the above mentioned each film, besides dry lamination, extrusion coating and non-solvent lamination can be applied.

The white color printed layer 14a and the light shielding printed layer 14b and further the pattern printed layer 14c of the above mentioned light shielding layer 14 can be formed by the normal gravure printing method and the other printing methods by the use of normal oily- or water-based printing ink. And since printing inks used for packaging materials have peculiar odors caused by pigments, binders, and other ingredients (hereinunder odor ingredients) and since organic solvents are used in addition to the case of oily based printing inks, odor ingredients in the light shielding layer 14 can be migrated to contents filled in the bag, and in case of migration, sometimes contents become ill flavors. Influences of odor ingredients generate particularly by heat treatments such as boiling and retort (normally sterilization purpose).

Also, according to the conventional packaging material by the use of metal foil, odor ingredients of printed layer positioned at the external side cause no problem such as migration to contents because metal foil blocks odor ingredients and deterioration of flavors by odor ingredients causes less problem if the thickness (an amount of ink) is used for normal printing of pattern but in case that the light shielding layer 14 for the purpose of light shielding, the thickness to the printed layer (an amount of ink) has a tendency to be thick (large amount) compared with normal printings, so that deteriorations of flavors can sometimes become a problem.

Accordingly, when there is a possibility of migration of odor ingredients to contents, the possibility is necessary to be eliminated. Therefore, with respect to the packaging material provided the light shielding by applying the light shielding printed layer in the layer structure, the following preferable example is shown to eliminate even the possibility of the odor ingredients migration.

Figure 9:
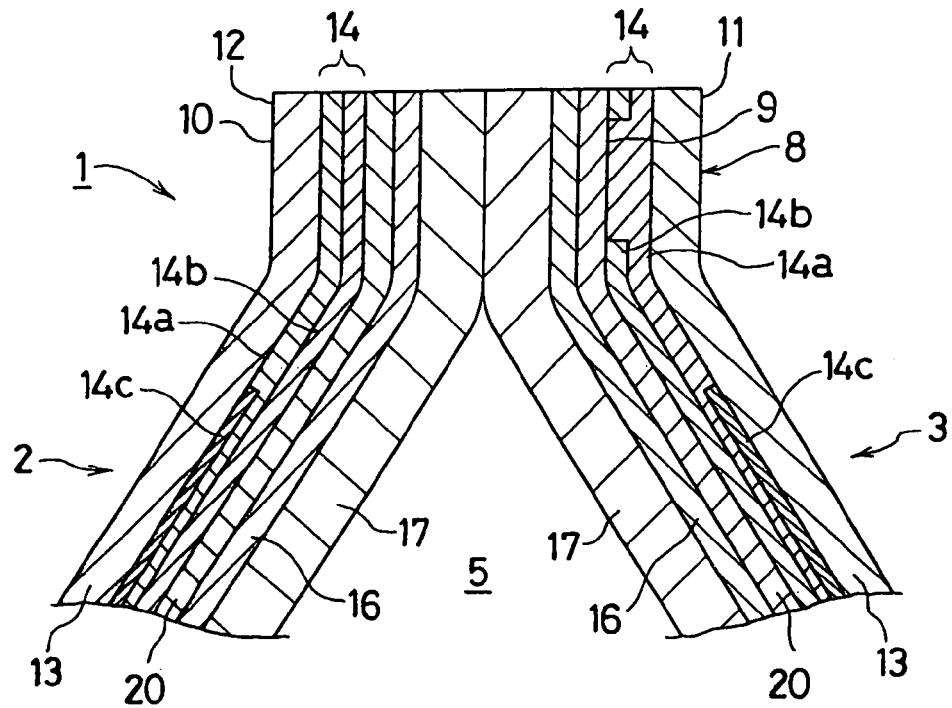
FIG. 9 illustrates a preferred embodiment having an odor ingredients barrier layer of a packaging material according to the present invention.
Figure 10:
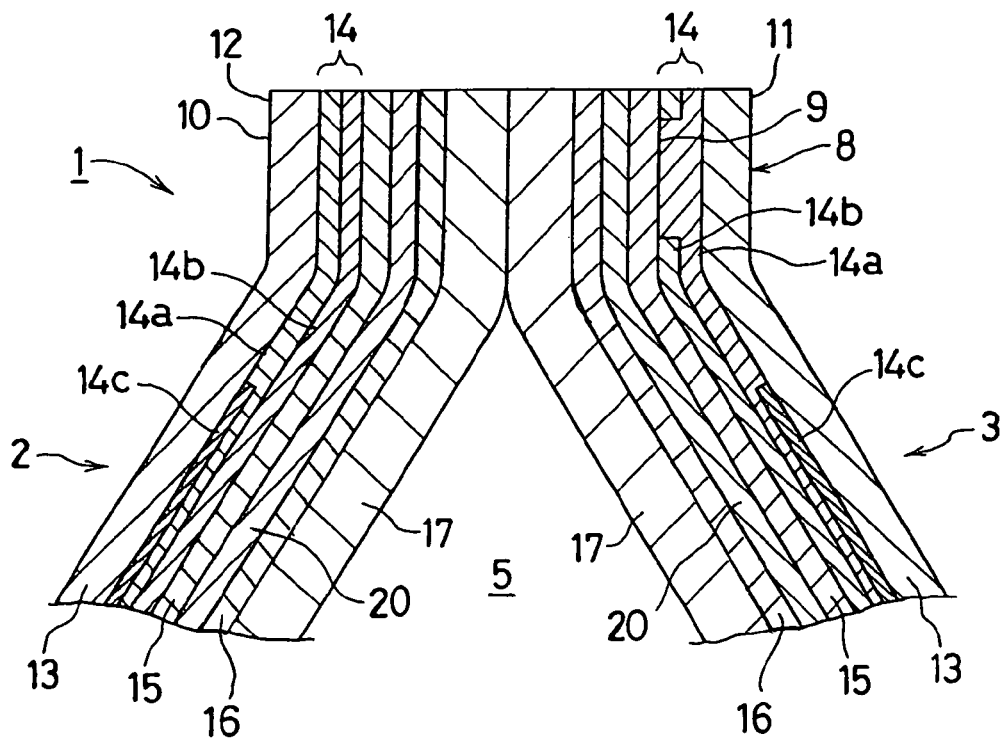
FIG. 10 illustrates another preferred embodiment having an odor ingredients barrier layer according to the present invention.

To be more precise, as shown in FIG. 9, the packaging bag 1 providing the layer structure of lamination from the internal side of the bag to the external side of the bag, is preferable to be laminated as the sealant layer 17, the intermediate base material layer 16, the odor ingredients barrier layer 20, the light shielding layer 14, and the base material film layer 13. Also, as shown in FIG. 10, the layer structure can be provided to laminate, from the internal side of the bag to the external side of the bag, as the sealant layer 17, the intermediate base material layer 16, the odor ingredients barrier layer 20, the barrier layer 15, the light shielding layer 14, and the base material film 13. By making the above layer structure, the packaging material having more excellent gas barrier property can be provided.

The above mentioned odor ingredients barrier layer 20 which is in the internal side of the bag from the light shielding layer 14 when packaging, and which is located between the light shielding layer 14 and the sealant layer 17, is desirable to provide shielding or impermeability against odor ingredients to the internal side of the bag caused by the printing inks in the light shielding layer 14, and the transparent gas barrier film (the film that is vapor deposited of inorganic compound such as silicate dioxide or aluminum oxide (alumina) to mono- or bi-axial thermoplastic resin film (Toppan Printing Co., Ltd. Trade name GL Film) and the like) which can be used to the above mentioned barrier layer 15 is preferable to be applied, and besides other films such as polyethylene terephthalate, polyvinylidene chloride, saponified ethylene-vinyl acetate copolymer, MXD-Ny and the like and film coated by barrier coating resins can also be applied.

Naturally, to the above mentioned example, the intermediate base material layer 16 which is provided between the sealant layer 17 and odor ingredients barrier layer 20 can be provided by oriented nylon film as the impact absorption layer which provides the excellent impact strength so as to absorb the impact. Moreover, the oriented nylon film for the base material film 13 or barrier layer 15 can be provided as an additional role for impact absorption layer. However, even in the above mentioned example, the intermediate base material layer 16 is not required essentially.

And in the example of having the odor ingredients barrier layer as the sealant layer, non-oriented polypropylene film can be used, and other thermoplastic resin film if applicable to the condition, can be applied, and film made from polyolefin resin such as polyethylene, polypropylene, ethylene-vinyl acetate copolymer, ethylene-propylene block copolymer and the like can be used.

Besides dry lamination, extrusion coating and non-solvent lamination and the like can be applied for lamination between each of the above mentioned film.

The detail examples of layer structures of the packaging materials providing the above mentioned odor ingredients barrier layer 20 and equally providing the light shielding layer 14 are shown as follows.

PET(base material film)/light shielding film/adhesive/aluminum oxide vapor deposition PET(odor ingredients barrier layer and aluminum oxide vapor deposition to PET)/adhesive/CPP(sealant layer)

PET(base material film)/light shielding film/adhesive/aluminum oxide vapor deposition ONy (odor ingredients barrier layer and aluminum oxide vapor deposition to ONy)/adhesive/CPP(sealant layer)

aluminum oxide vapor deposition PET(base material film)/light shielding film/adhesive/aluminum oxide vapor deposition PET(odor ingredients barrier layer/adhesive/CPP(sealant layer)

PET(base material film))/light shielding layer/adhesive/ aluminum oxide vapor deposition PET (odor ingredients barrier layer)/adhesive/ONy (impact absorption layer)/ adhesive/CPP(sealant layer)

PET(base material film)/light shielding layer/adhesive/ aluminum oxide vapor deposition PET (odor ingredients barrier layer)/adhesive/(Ny/CPP) coextrusion film (impact absorption layer and sealant layer)

Here, PET is polyethylene terephthalate film, ONy is oriented nylon film, and CPP is non-oriented polypropylene film. Also, (Ny/CPP) coextrusion film comprises lamination film of non-oriented nylon film and non-oriented polypropylene film.

As the packaging materials of the present invention provided an additional odor ingredients barrier layer, the following Example 2 and Comparative Example 6 are prepared as the following structure, and migrations of odor ingredients are observed by the method described below.

<The Layer Structure of the Packaging Material Having the Odor Ingredients Barrier Layer in Example 2>

PET(base material film)/light shielding layer/adhesive/ aluminum oxide vapor deposition PET (odor ingredients barrier layer)/adhesive/ONy (intermediate material layer)/adhesive/CPP(sealant layer)

The light shielding layer as the above mentioned Example 1 (The light shielding layer of the seal state confirming part 8 is made only with the white color printed layer 14a) is formed on PET film having thickness 12 μm in the same as the above mentioned Example 1. The light shielding layer 14 is laminated with transparent gas barrier film which is provided 12 μm thick PET film having 50 nm aluminum oxide vapor deposition layer (Toppan Printing Co., Ltd. GL Film (Trade Name)) as the odor ingredients barrier layer by means of dry lamination method (The vapor deposition side is positioned so as to face to the sealant layer 17). Subsequently, the packaging material of the present invention is obtained where 15 μm thick biaxially oriented 6,6 nylon film (as the intermediate base material film) and 60 μm thick non-oriented polypropylene film (as the sealant layer 17) is laminated in the subsequent manner on the aluminum oxide vapor deposition layer by means of dry lamination method.

<The Layer Structure of Comparative Example 6>
   aluminum oxide vapor deposition PET(base material film)/light shielding film/adhesive/ONy(intermediate base material layer)/adhesive/CPP (sealant layer)

The light shielding layer 14 is formed as same in Example 2 to a vapor deposition layer of the transparent gas barrier film which is provided by 12 μm thick PET film having 50 nm aluminum oxide vapor deposition layer (Toppan Printing Co., Ltd. GL Film (Trade Name)). Comparative Example 6 packaging material is prepared where biaxially oriented 6,6 nylon film (as the intermediate base material film) as same in Example 2 and non-oriented polypropylene film (as the sealant layer 17) are laminated in subsequent manner by means of dry lamination method.

The light shielding properties other than both of the seal state confirming layers show sufficient light shielding property for food storage packaging material where the total light transmittance is 10% or less (Measurement apparatus: Shimazu Spectrophotometry).

By applying the packaging materials, a four-edge sealed bag of the size 130 mm by 180 mm is made and after 200 ml of distilled water are filled as a content and sealed, a retort treatment was conducted at 121° C. for 30 minutes. Subsequently, the content (distilled water) was analyzed by GC-MS analytical apparatus made by Agilent Technologies.

The both of total light transmittances, other than the seal state confirming part 8, show 10% or less on after retort sterilization.

The oxygen permeability after retort sterilization of the packaging material in Example 2 is 14.0 ml/m$^2$·day·MPa, and Comparative Example 6 is 16.0 ml/m$^2$·day·MPa. The oxygen permeability is measured under the condition of 30° C., 70% RH by MOCON method.

As a result according to the above mentioned analytical apparatus, the ingredients supposedly caused by printing ink are observed only in Comparative Example 6. Also according to the organoleptic test for both contents, no foreign taste or foreign odor was detected in Example 2 while a subtle foreign taste or foreign odor was found in Comparative Example 6.

Therefore, Example 2 is concluded that the packaging material is suitable to obtain the packaging container to keep retort food.

INDUSTRIAL APPLICABILITY

As described above, according to the present invention, since a seal state confirming part is provided at intended position for heat seal in one side of packaging materials when packaging is made, at heat seal parts of a fill opening or folded parts of a packaging bag having the seal state confirming part, the existence of a defective seal caused by bitten or insufficient seal can be easily confirmed so that the tight seal is able to guarantee. And also it is possible to deal and to make clear the existence of defective seal optically. Moreover, by providing an odor ingredients barrier layer, the packaging material becomes to be able to prevent securely an influence to contents from odor ingredients in printing inks used for the formation of a light shielding layer to contents, and performs practically excellent effect.

TABLE 1

| | Combination | | Light Beam Transmittance (%) A Light Shielding Layer/B Seal State Confirming Part | Defective Recognition | |
|---|---|---|---|---|---|
| | A Light Shielding Layer | B Seal State Confirming Part | | Reflection Diffusion | Absorption Transmittance |
| Example 1 | White Printed Layer/ Light Shield. Print Layer (Sepia Color) | White Printed Layer | 6.7/27 | ◯ | ◯ |
| Comparative Example 1 | White Printed Layer | White Printed Layer | 27/27 | X No Contrast Difficult Unseating Part Recognition | ◯ |
| Comparative Example 2 | White Printed Layer/ Light Shield. Print Layer (Sepia Color) | No Printing (Transparent) | 6.7/100 | X No Reflection Difficult Unsealing Part Recognition | ◯ |
| Comparative Example 3 | White Printed Layer/ Light Shield. Print Layer (Sepia Color) | White Printed Layer/ Light Shield. Print Layer (Sepia Color) | 6.7/6.7 | X No Contrast Difficult Unsealing Part Recognition | Δ Bad Transmittance Difficult to Recognize by Light Shield Color |
| Comparative Example 4 | Aluminum | White Printed Layer | 0/27 | ◯ | X Difficult to Recognize by Light Beam Shield |
| Comparative Example 5 | Sepia Color Printed Layer/Translucent Color CPP | Translucent Color CPP | 8.5/30 | Δ Be Affected Uneven Contrast, Uneven Sealing | X Be Affected Uneven Sealing |

Translucent color CPP: Translucent color non-oriented polypropylene film

TABLE 2

| | Combination | | Light Beam Transmittance (%) A Light Shielding Layer/B Seal State Confirming Part | Defective Recognition | |
|---|---|---|---|---|---|
| | A Light Shielding Layer | B Seal State Confirming Part | | Reflection Diffusion | Absorption Transmittance |
| Achromatic color | White Printed Layer/ Light Shield. Print Layer (Sepia Color) | Gray Printed Layer/ White Printed Layer | 6.7/14 | X | Δ |
| Chromatic color 1 | White Printed Layer/ Light Shield. Print Layer. (Sepia Color) | Red Printed Layer/ White Printed Layer | 6.7/25 | ○ | ○ |
| Chromatic color 2 | White Printed Layer/ Light Shield. Print Layer (Sepia Color) | Orange Printed Layer/White Printed Layer | 6.7/28 | ○ | ○ |
| Chromatic color 3 | White Printed Layer/ Light Shield. Print Layer (Sepia Color) | Yellow Gray Printed Layer/White Printed Layer | 6.7/30 | ○ | ○ |
| Chromatic color 4 | White Printed Layer/ Light Shield. Print Layer (Sepia Color) | Green Printed Layer/ White Printed Layer | 6.7/12 | ○ | Δ |
| Chromatic color 5 | White Printed Layer Light Shield. Print Layer (Sepia Color) | Indigo Printed Layer/White Printed Layer | 6.7/8 | X | Δ |
| Chromatic color 6 | White Printed Layer/ Light Shield. Print Layer (Sepia Color) | Purple Printed Layer/White Printed Layer | 6.7/14 | X | Δ |

The invention claimed is:

1. A multi-layered packaging member, comprising:
a light shielding layer formed by printing, in a multi-layer layer structure, a white color printed layer that is printed by white color ink and a light shielding printed layer that is printed by a light shielding ink, the light shielding layer having positions intended for heat seal to be laid on and heat sealed with each other for making a packaging bag, wherein
one of the heat seal positions is provided with a seal state confirming part, the seal state confirming part being inside of the heat seal position and covering an entire length of the heat seal position and including the white color printed layer and not the light shielding printed layer, a light transmittance of the seal state confirming part being greater than a light transmittance of the other positions intended for heat seal.

2. The multi-layered packaging member according to claim 1, wherein the difference between the light transmittance of the seal state confirming part and the light transmittance of the other positions intended for heat seal is 15 percent or more.

3. The multi-layered packaging member according to claim 1, wherein said seal state confirming part is in an area where a blank pattern of the light shielding ink is located.

4. The multi-layered packaging member according to claim 1, wherein the multi-layer structure has an odor ingredients barrier layer at an internal side of the light shielding layer in the bag when the bag is made.

5. The multi-layered packaging member according to claim 1, wherein the multi-layer structure has an impact resistive layer that absorbs impact.

6. A packaging bag, comprising:
a first multi-layered packing member including a first heat seal position along one entire length of the first multi-layered packing member, the first multi-layered packing member being a laminate formed by printing a white color printed layer that is printed by white color ink and a light shielding printed layer that is printed by a light shielding ink; and
a second multi-layered packing member including a second heat seal position along one entire length of the second multi-layered packing member corresponding to the heat seal position of the first multi-layered packing member, the second multi-layered packing member being a laminate formed by printing a white color printed layer that is printed by white color ink and a light shielding printed layer that is printed by a light shielding ink, the second multi-layered packing member including a seal state confirming part along the heat seal position and including the white color printed layer and not the light shielding printed layer.

7. The packaging bag according to claim 6, wherein a light transmittance of the heat seal confirming part is greater than a light transmittance of first heat seal position.

8. The packaging bag according to claim 7, wherein a difference between the light transmittance of the seal state confirming part and the light transmittance of the first seal position is 15 percent or more.

9. The packaging bag according to claim 7, wherein said seal state confirming part is in an area in which a blank pattern of the light shielding ink is located.

10. The packaging bag according to claim 7, wherein each of the first multi-layered packing member and the second multi-layered packing member has an odor ingredients barrier layer at an internal side.

11. The packaging bag according to claim 7, wherein each of the first multi-layered packing member and the second multi-layered packing member has an impact resistive layer which absorbs impact.

* * * * *

UNITED STATES PATENT AND TRADEMARK OFFICE
CERTIFICATE OF CORRECTION

PATENT NO. : 7,658,543 B2
APPLICATION NO. : 10/511313
DATED : February 9, 2010
INVENTOR(S) : Shunichi Shiokawa et al.

It is certified that error appears in the above-identified patent and that said Letters Patent is hereby corrected as shown below:

Column 13, Line 33, before "structure," delete "layer". (Second occurrence)

Signed and Sealed this

Thirteenth Day of July, 2010

David J. Kappos
*Director of the United States Patent and Trademark Office*